US010359908B2

(12) United States Patent
Raszka et al.

(10) Patent No.: US 10,359,908 B2
(45) Date of Patent: Jul. 23, 2019

(54) GRAPHICAL USER INTERFACE FOR PRESENTING A MENU OF OPTIONS

(75) Inventors: Robin Raszka, Hostivice (CZ); Nicholas D'Aloisio-Montilla, London (GB); Bart K. Swanson, Remsenburg, NY (US)

(73) Assignee: OATH INC., New York, NY (US)

( * ) Notice: Subject to any disclaimer, the term of this patent is extended or adjusted under 35 U.S.C. 154(b) by 490 days.

(21) Appl. No.: 14/427,330

(22) PCT Filed: Sep. 11, 2012

(86) PCT No.: PCT/US2012/054566
§ 371 (c)(1),
(2), (4) Date: Jul. 22, 2015

(87) PCT Pub. No.: WO2014/042612
PCT Pub. Date: Mar. 20, 2014

(65) Prior Publication Data
US 2015/0324069 A1    Nov. 12, 2015

(51) Int. Cl.
*G06F 3/0481* (2013.01)
*G06F 3/0482* (2013.01)
*G06F 3/0484* (2013.01)

(52) U.S. Cl.
CPC .......... *G06F 3/0482* (2013.01); *G06F 3/0481* (2013.01); *G06F 3/04842* (2013.01)

(58) Field of Classification Search
CPC .. G06F 3/0482; G06F 3/04842; G06F 3/0488; G06F 3/04812; G06F 3/0481
See application file for complete search history.

(56) References Cited

U.S. PATENT DOCUMENTS

| | | | |
|---|---|---|---|
| 8,627,233 B2* | 1/2014 | Cragun | G06F 3/04812 715/823 |
| 2004/0066411 A1 | 4/2004 | Fung et al. | |
| 2007/0094597 A1* | 4/2007 | Rostom | G06F 3/0482 715/700 |
| 2007/0266093 A1* | 11/2007 | Forstall | G06F 3/04817 709/204 |
| 2008/0235627 A1* | 9/2008 | Torning | G06F 3/0482 715/841 |
| 2010/0251179 A1* | 9/2010 | Cragun | G06F 3/04812 715/834 |
| 2010/0306702 A1* | 12/2010 | Warner | G06F 3/0482 715/811 |

(Continued)

OTHER PUBLICATIONS

Kazmucha, "Period Tracker vs. iPeriod vs. Period Dairy: User Interface" (retrieved from Internet on Dec. 1, 2014), https://web.archive.org/web/2012/0908151742/http://www.imore.com/period-tracker-vs-iperiod-vs-period-diary-period-tracker-apps-iphone-shootout>, published on Sep. 8, 2012 as per Wayback Machine (30 pages).

(Continued)

*Primary Examiner* — Haoshian Shih
(74) *Attorney, Agent, or Firm* — James J. DeCarlo; Greenberg Traurig, LLP (57) ABSTRACT

One embodiment of a graphical user interface for providing a menu to a user, wherein the menu comprises a plurality of executable actions, includes a plurality of petals, wherein each of the plurality of petals is associated with one of the plurality of executable actions, and a common central point at which all of the plurality of petals meet.

20 Claims, 6 Drawing Sheets

(56) References Cited

U.S. PATENT DOCUMENTS

2013/0173445 A1*  7/2013  Johnson ................ G06Q 40/04
                                                  705/37
2013/0235074 A1*  9/2013  Cherna .................. G06T 11/60
                                                  345/619

OTHER PUBLICATIONS

Patent Examination Report No. 1 from corresponding Australian Application No. 2012327244 dated Dec. 3, 2014 (4 pages).

* cited by examiner

GRAPHICAL USER INTERFACE FOR PRESENTING A MENU OF OPTIONS

FIELD OF THE INVENTION

The present invention generally relates to the field of human-machine interaction, and more specifically relates to a graphical user interface.

BACKGROUND

Personal computers, smart phones, mobile computing devices, gaming devices, and other end-user computing platforms rely heavily on user interfaces that facilitate interactions between the device and the user. These user interfaces typically mask the details of computer commands and computations with user-friendly and easily comprehensible graphical icons.

Ideally, a graphical user interface (GUI) allows a user to perform a common task in a simple and efficient manner, without disrupting other activities in which the user may be engaged on the computing device. These considerations are even more important when interacting with mobile devices, which tend to have limited display areas.

SUMMARY OF THE INVENTION

One embodiment of a graphical user interface for providing a menu to a user, wherein the menu comprises a plurality of executable actions, includes a plurality of petals (e.g., arranged in a flower shape), wherein each of the plurality of petals is associated with one of the plurality of executable actions, and a common central point at which all of the plurality of petals meet.

In further embodiments, each of the plurality of petals comprises a generally tapered shape that tapers outward from the common central point; each of the plurality of petals displays a graphic associated with one of the plurality of executable actions; the graphic is at least one of: an alphanumeric character, an icon, or a logo; the graphical user interface is superimposed over at least a portion of a display of the device operated by the user; the device operated by the user is a computing device having a touch screen display; the graphical user interface is movable within boundaries of a display of the device operated by the user; the plurality of executable actions include actions relating to the sharing of data; the data is a document or a document summary; and the plurality of petals are of equal size.

In another embodiment, a method for providing a menu to a user, wherein the menu comprises a plurality of executable actions that may be taken by a device operated by the user, includes receiving a first signal from the user indicating that the user wishes to act with respect to an application currently executing on the device and displaying the menu on the device in the form of a graphical user interface, wherein the graphical user interface comprises a plurality of petals, wherein each of the plurality of petals is associated with one of the plurality of executable actions, and a common central point at which all of the plurality of petals meet.

In further embodiments, the first signal is received via a touch screen display of the device; the displaying comprises presenting the plurality of petals in a stack and opening the plurality of petals from the stack until all of the plurality of petals are visible; the stack comprises a first petal of the plurality of petals, the first petal being visible on a top of the stack, wherein the first petal is a first petal encountered in the graphical user interface when moving in a clockwise direction from a top of the graphical user interface and a last petal of the plurality of petals, the last petal being positioned directly beneath the first petal, wherein the last petal is a last petal encountered in the graphical user interface when moving in the clockwise direction from the top of the graphical user interface; the stack further comprises a remainder of the plurality of petals positioned beneath the last petal in a descending order in which the remainder of the plurality of petals are encountered in the graphical user interface when moving in the clockwise direction from the top of the graphical user interface; the opening comprises rotating the plurality of petals in a clock-wise direction, such that when the opening is complete, a corolla is formed in which the last petal is positioned next to the first petal; the method further comprises receiving a second signal from the user indicating that the user wishes to execute one of the plurality of executable actions and executing the one of the plurality of executable actions responsive to the second signal; the method further comprises closing the graphical user interface after receiving the second signal; and the closing comprises rotating the plurality of petals in a counter-clockwise direction until the plurality of petals forms a stack, wherein only one of the plurality of petals is visible on top of the stack and removing the stack from a display of the device.

In another embodiment, a tangible computer readable medium contains an executable program for providing a menu to a user, wherein the menu comprises a plurality of executable actions that may be taken by a device operated by the user. The program includes receiving a first signal from the user indicating that the user wishes to act with respect to an application currently executing on the device and displaying the menu on the device in the form of a graphical user interface, wherein the graphical user interface comprises a plurality of petals, wherein each of the plurality of petals is associated with one of the plurality of executable actions, and a common central point at which all of the plurality of petals meet.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a graphical user interface (GUI) for presenting a menu of options in a user-friendly and aesthetically pleasing manner. Particular embodiments of the invention provide a GUI that allows a user to share a document summary in one or more of a plurality of potential forms, where each option is presented visually as a petal of a flower. For instance, the GUI may allow the user to share the document summary via a social media web site, a blog, an email message, or the like. Although the GUI is described herein within the exemplary context of sharing and/or saving documents or document summaries, it will be appreciated that the GUI can be implemented in any situation in which a user is presented with a menu of potential choices of actions.

Figure 1:
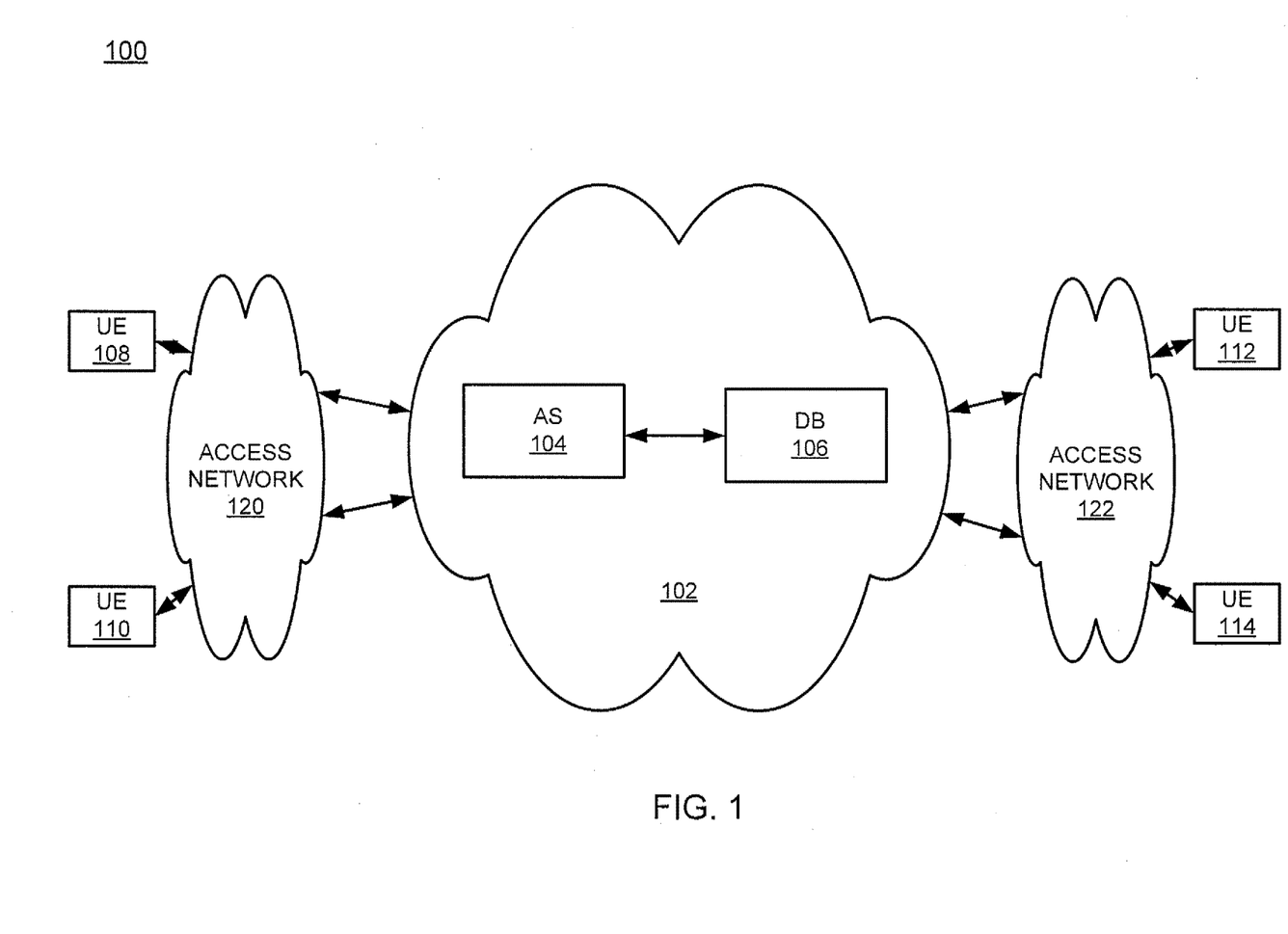
FIG. 1 is a block diagram depicting one example of a communications network within which embodiments of the present invention may be deployed.

FIG. 1 is a block diagram depicting one example of a communications network 100 within which embodiments of the present invention may be deployed. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, the core network 102 may comprise a portion of a cloud environment in which services and applications are supported in a highly distributed manner.

In one embodiment, the AS 104 may comprise a general purpose computer as illustrated in FIG. 7 and discussed below. In one embodiment, the AS 104 may perform the methods and algorithms related to summarizing the contents of electronic documents, for example as described in Patent Cooperation Treaty (PCT) application serial no. WO2012nnnnnn, filed on even date herewith.

In one embodiment, the DB 106 stores summaries of electronic documents that have been harvested and summarized by the AS 104. In addition, the DB 106 may store profiles for users of the network 100. For example, the DB 106 may store cellular telephone numbers, email addresses, social media profiles, and the like for each user. In addition, the DB 106 may store the users' preferences with respect to the types of content in which they are interested.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer, a cash register, or a mobile endpoint device such as a cellular telephone, a smart phone, a tablet computer, a laptop computer, a netbook, an ultrabook, a portable media device (e.g., an MP3 player), a gaming console, a portable gaming device, a digital camera, and the like. It should be noted that although only four user endpoint devices are illustrated in FIG. 1, any number of user endpoint devices may be deployed. In one particular embodiment, the user endpoint devices 108, 110, 112, and 114 are touch screen devices. In one embodiment, any of the user endpoint devices may have one or more sensors integrated therein. These sensors may include, for example, location sensors, environmental sensors, acoustic sensors, position sensors, optical sensors, pressure sensors, proximity sensors, and the like. The AS 104 may subscribe to the outputs of these sensors, as discussed in greater detail below. Furthermore, the user endpoint devices 108, 110, 112 and 114 may display to respective users a graphical user interface (GUI) as described herein that allows a user to share a document summary with others.

It should be noted that the network 100 has been simplified. For example, the network 100 may include other network elements (not shown) such as border elements, routers, switches, policy servers, security devices, a content distribution network (CDN) and the like.

Figure 2:
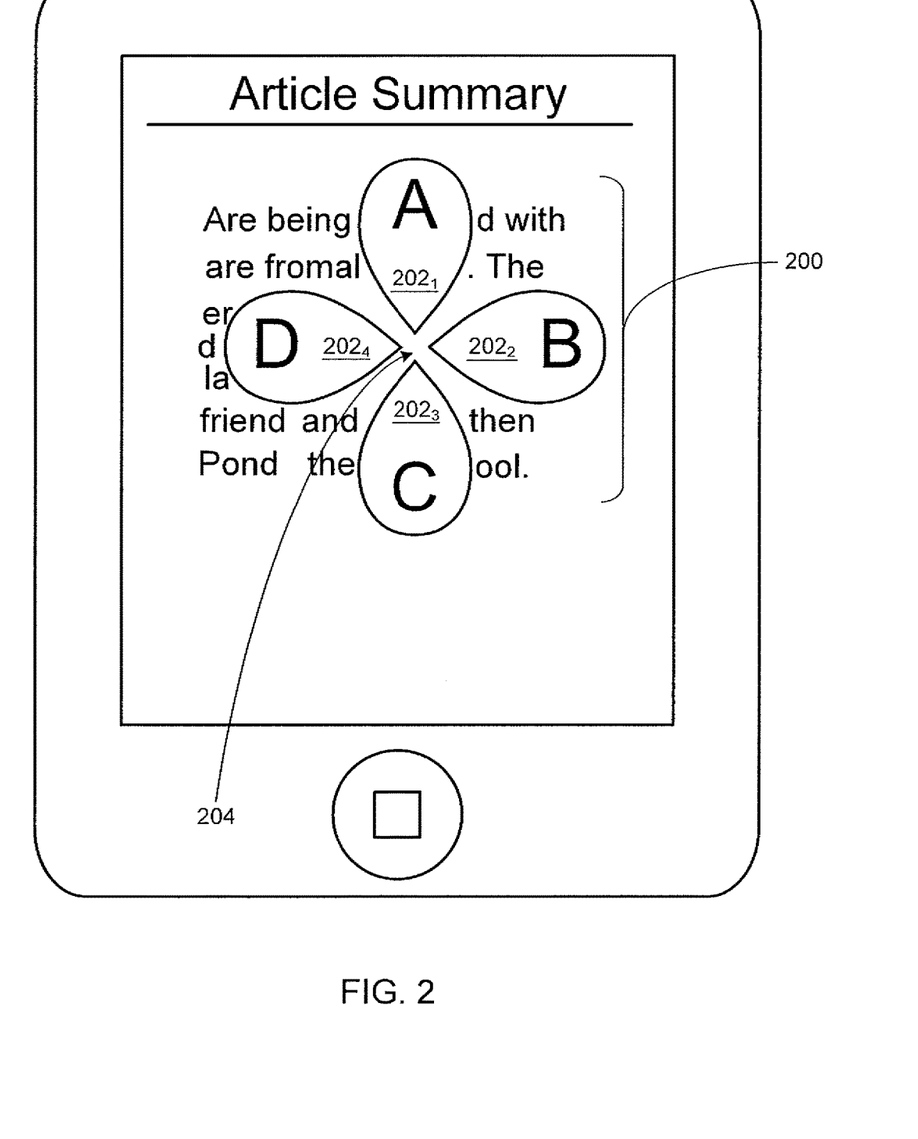
FIG. 2 illustrates an exemplary embodiment of a graphical user interface for displaying a menu of options, in accordance with the present invention.

FIG. 2 illustrates one embodiment of a graphical user interface (GUI) 200 for displaying a menu of options, in accordance with the present invention. In this illustrative embodiment, the GUI 200 is displayed on a touch screen display of the user endpoint device 108 of FIG. 1.

As illustrated, the GUI 200 is generally configured as a flower comprising a plurality of petals $202_1$-$202_4$ (hereinafter collectively referred to as "petals 202") that collectively form a corolla. In one embodiment, the petals 202 comprise a generally tapered shape similar to a guitar pick, although other shapes are possible. Although the GUI 200 illustrated in FIG. 2 is illustrated as comprising four petals 202, it will be appreciated that the GUI 200 may include any number of petals. For instance, in one embodiment, the GUI 200 comprises any number of petals 202 greater than two. The petals 202 radiate or taper outward from a common central point 204 at which the petals 202 meet.

In one embodiment, each of the petals 202 displays a graphic associated with a particular executable action that may be taken. In the embodiment illustrated in FIG. 2, these graphics are illustrated as the alphanumeric characters A, B, C, and D. The graphics may comprise alphanumeric characters, icons, logos, or the like. For instance, in one embodiment, the graphics might include operating system icons associated with email or text messaging, or the logos for specific social media services. In one embodiment, the graphics are language-independent.

As illustrated, the GUI 200 is superimposed upon at least a portion of the display of the user endpoint device 108. In the illustrated embodiment, the GUI 200 is superimposed over a document summary displayed on the display of the user endpoint device 108, and the actions associated with the petals 202 comprise actions that the user may take with respect to the underlying document summary. For instance, petal $202_1$ may allow the user to share the document summary via the user's microblogging account; petal $202_2$ may allow the user to share the document summary via the user's social media profile; petal $202_3$ may allow the user to share the document summary via an email message; and petal $202_4$ may allow the user to save the document summary locally on the user endpoint device 108. The user launches an action by selecting the associated petal 202 of the GUI 200. For instance, the user might select a given petal 202 by pressing the petal 202 on a touch screen display, or by positioning a cursor of a non-touch screen display over the given petal 202 and clicking a button on a mouse.

In one embodiment, the GUI 200 is movable on the display. For instance, the GUI 200 may initially be positioned in any region of the display. However, the user may wish to move the GUI 200 so that he can view the underlying display. In one embodiment, the GUI 200 is moved by selecting (e.g., pressing on a touch screen display or positioning a cursor on a non-touch screen display) the GUI 200 and dragging it to the desired region of the display. In one embodiment, moving the GUI 200 may include automatically adjusting the size of the GUI 200 to fit within the boundaries of the desired region of the display.

Figure 3:
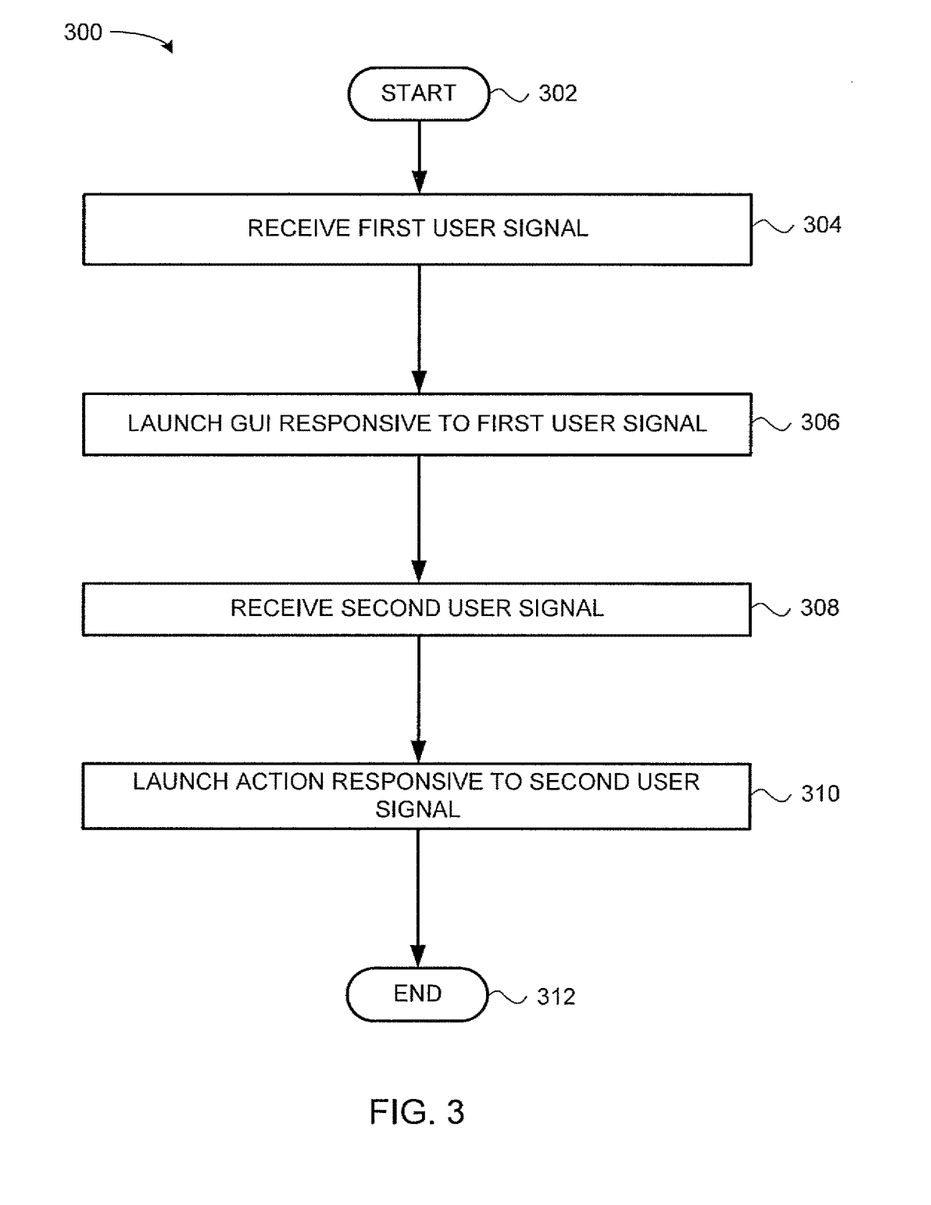
FIG. 3 is a flow diagram illustrating one embodiment of a method for interacting with a user via the graphical user interface illustrated in FIG. 2, according to the present invention.

FIG. 3 is a flow diagram illustrating one embodiment of a method 300 for interacting with a user via the graphical user interface 200 illustrated in FIG. 2, according to the present invention. The method 300 may be performed, for example, by any of the user endpoint devices 108, 110, 112, and 114 illustrated in FIG. 1. Accordingly, the method 300 is described for illustrative purposes as being performed on the user endpoint device 108.

The method 300 begins in step 302 and proceeds to step 304, where the user endpoint device 108 receives a first signal from a user indicating that the user wishes to take some action with respect to an application that is currently executing on the user endpoint device 108. In one embodiment, where the user endpoint device 108 is a touch screen device, the first user signal may be indicated by the user pressing the display for a defined period of time (e.g., at least x seconds) or touching a particular region (e.g., icon) of the display. In another embodiment, where the user endpoint device 108 is not a touch screen device, the first user signal may be indicated by the user positioning the cursor in a particular region of the display and/or clicking a button on a mouse. In still a further embodiment, the first user signal may be a verbal instruction.

In step 306, the user endpoint device 108 launches the GUI 200 responsive to the first user signal. One embodiment of a method for launching the GUI 200 is described in greater detail below in connection with FIG. 4. In step 308, the user endpoint device 108 receives a second signal from the user indicating that the user wishes to take further action. In one embodiment, the further action is an action associated with one of the petals 202 of the GUI 200 (e.g., share an underlying document summary via an email message). In this case, the second signal comprises the user interacting with (e.g., pressing) a particular petal 202. In an alternative embodiment, the further action is to close the GUI 200 (e.g., the user has changed her mind and does not wish to take any of the actions associated with the petals 202). In this case, the second signal comprises the user interacting with (e.g., pressing) a region of the display outside of the GUI 200. In one embodiment, the second signal may be received in any of the ways that the first signal is received (in step 304).

In step 310, the user endpoint device 108 launches an action responsive to the second user signal. If the second user signal requests an action associated with one of the petals 202 of the GUI 200, then the user endpoint device 108 launches the associated action. This may involve contacting a remote server (e.g., AS 104 of FIG. 1) or prompting the user to enter additional information (e.g., a username and/or password to access a service, or a destination address or subject line for a message).

If the second user signal requests closing the GUI 200, then the user endpoint device 108 closes the GUI 200. One embodiment of a method for closing the GUI 200 is described in greater detail below in connection with FIG. 4. Once the user endpoint device 108 has launched a responsive action in accordance with step 310, the method 300 ends in step 312.

Figure 4:
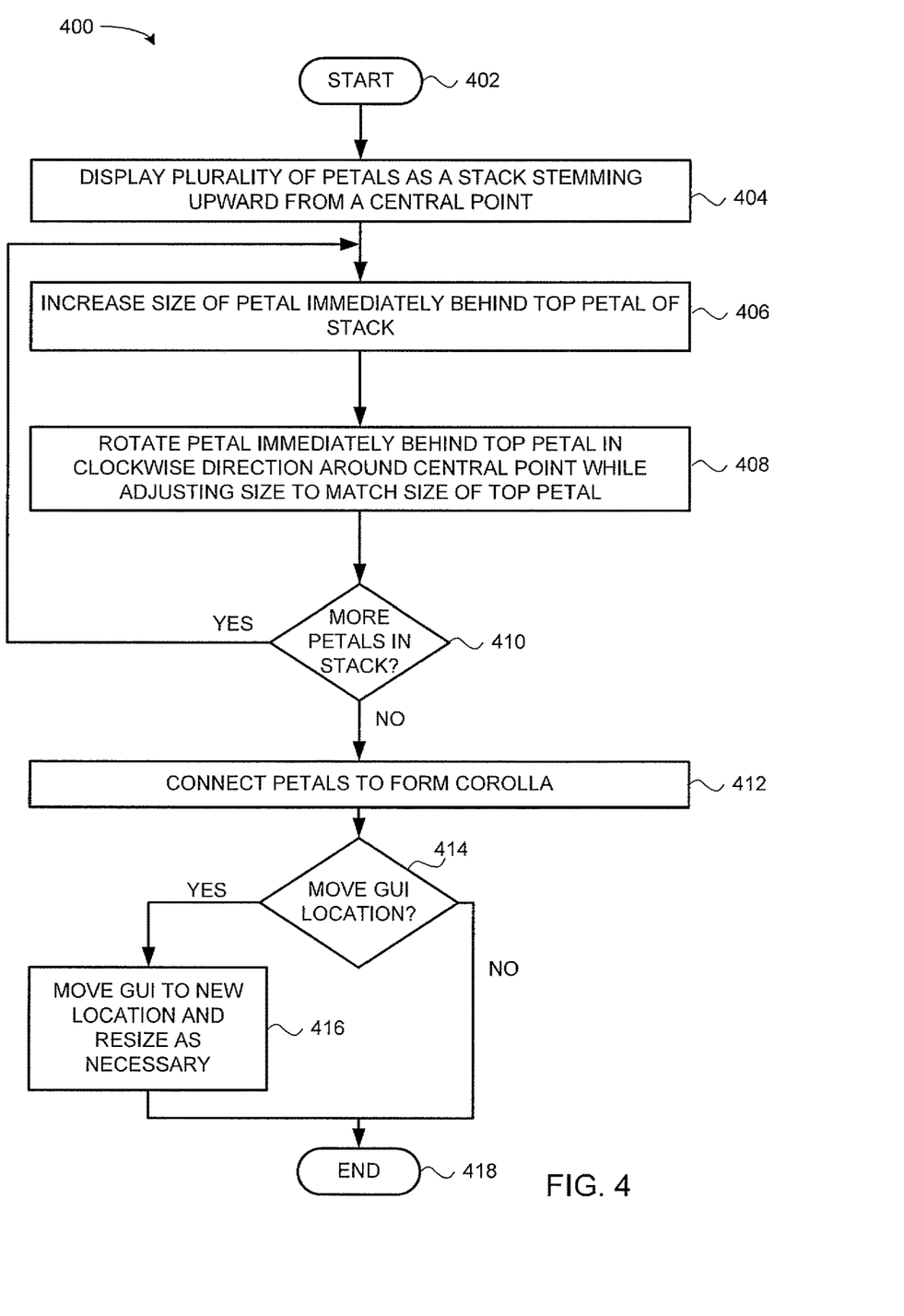
FIG. 4 is a flow diagram illustrating one embodiment of a method for launching the graphical user interface illustrated in FIG. 2, according to embodiments of the invention.

FIG. 4 is a flow diagram illustrating one embodiment of a method 400 for launching the GUI 200 illustrated in FIG. 2, according to embodiments of the invention. The method 400 may be implemented, for example, in accordance with step 306 of the method 300. As described in greater detail below, the GUI 200 is closed (e.g., in accordance with step 310 of the method 300) in a substantially reverse manner.

Figure 5A:
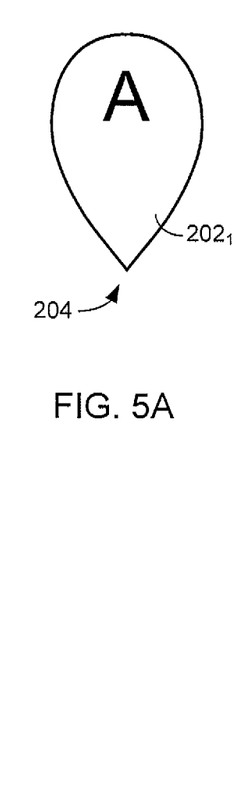
FIGS. 5A-5C illustrate various stages of the graphical user interface illustrated in FIG. 2 loading as it is launched on a display, according to one embodiment of the present invention.
Figure 5B:
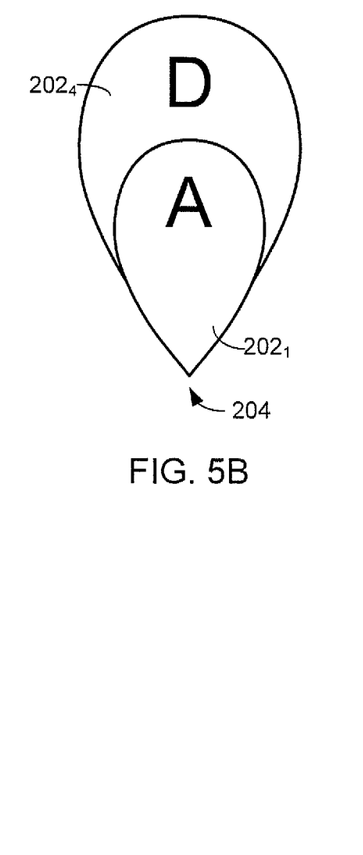
Figure 5C:
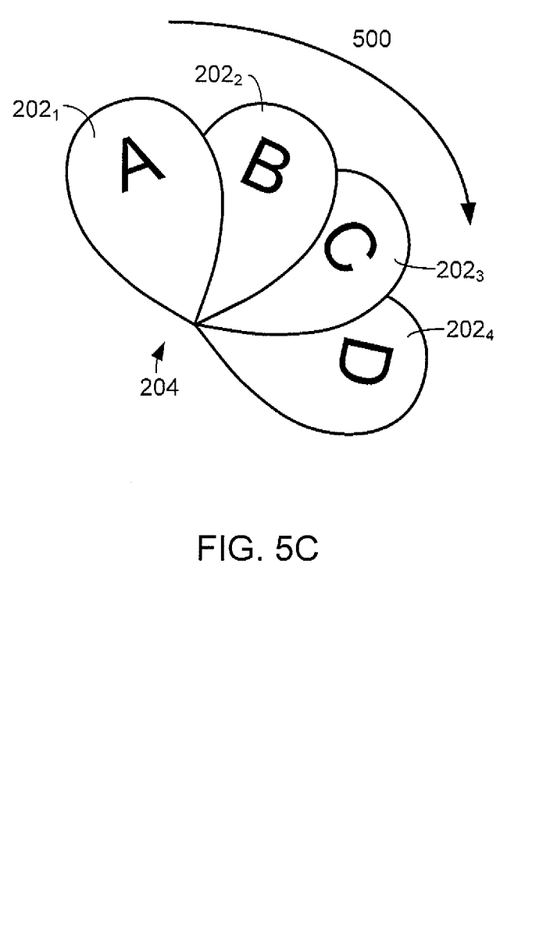

FIGS. 5A-5C illustrate various stages of the graphical user interface 200 illustrated in FIG. 2 loading as it is launched on a display, according to the method 400. As such, reference may be made simultaneously to FIG. 4 and FIGS. 5A-5C.

The method 400 begins in step 402. In step 404, the user endpoint device 108 displays the plurality of petals 202 as a stack of petals stemming upward from the central point 204, as illustrated in FIG. 5A. As discussed above, the stack may comprise any number of petals 202. Initially, only the top petal 202 on the stack is visible.

In step 406, the user endpoint device 108 increases the size of the petal immediately behind the top petal of the stack to a size that is larger than that of the top petal. In one embodiment, the top petal on the stack is the first petal $202_1$, while the petal immediately behind or beneath the top petal is the last petal $202_4$, as illustrated in FIG. 5B. In this context, the "first" and "last" petals are defined according to their positions in the fully-loaded GUI 200 (as illustrated in FIG. 2) as one moves in a clockwise direction starting with the top petal (petal $202_1$). The remaining petals 202 in the stack (if any) are ordered in descending order from the second-to-last petal (e.g., petal $202_3$) to the second petal (e.g., petal $202_2$), with the second petal being the bottom petal 202 in the stack.

In step 408, the user endpoint device 108 rotates the petal immediately behind the top petal $202_1$ in a clockwise direction around the central point 204, while adjusting the size of the petal immediately behind the top petal $202_1$ to match the size of the top petal $202_1$.

In step 410, the user endpoint device 108 determines whether there are any more petals 202 in the stack. If the user endpoint device concludes in step 410 that there are more petals 202 in the stack, then the method 400 returns to step 406. In this case, a new petal 202 (e.g., second-to-last petal $202_3$) is now the petal immediately behind the top petal (since the last petal $202_4$ has now been rotated outward in step 408), and the method 400 proceeds as described above to display and rotate the new petal 202. Thus, as illustrated in FIG. 5C, the petals 202 "open" from the stack in a clockwise manner to form the corolla. In particular, as illustrated in FIG. 5A, the first petal 202 to appear is the first petal $202_1$. As illustrated in FIG. 5B, the next petal 202 to appear is the last petal $202_4$, which appears behind the first petal $202_1$. In one embodiment, as a new petal 202 appears, it increases in size before rotating in a clockwise manner as indicated by the arrow 500 in FIG. 5C and described in connection with step 408. The remaining petals 202 appear and rotate in a similar manner, in the descending order from the second-to last petal (e.g., petal $202_3$) to the second petal (e.g., petal $202_2$). The speed at which the petals 202 appear and open is variable and in one embodiment may be user-defined.

If the user endpoint device 108 concludes in step 410 that no more petals 202 remain in the stack, then the method 400 proceeds to step 412. In step 412, the user endpoint device 108 connects the petals 202, all of which have now been displayed and rotated in accordance with step 408, to form the corolla. Thus, the GUI 200 now appears as illustrated in FIG. 2. In this embodiment, all of the petals 202 are of equal size when the corolla is fully formed.

In step 414, the user endpoint device 108 determines whether the location of GUI 200 on the display should be moved. For example, the user endpoint device may receive a user signal requesting that the GUI 200 be moved. If the user endpoint device 108 concludes in step 414 that the location of the GUI 200 should be moved, then the user endpoint device 108 moves the GUI 200 to a new location in step 416. In one embodiment, moving the GUI 200 includes designating a new location as the central point 204, and then resizing the GUI 200 as necessary around the central point 204 so that the GUI 200 can be accommodated in its new location. For instance, the length of the individual petals 202 or the overall size of the GUI 200 may have to be reduced in order for the GUI 200 to be fully visible within the boundaries of the display.

Once the GUI has been fully formed by connecting the petals 202 and optionally moved as necessary, the method 400 ends in step 418.

The manner of animating the launch of the GUI 200 (as illustrated in FIGS. 5A-5C) relies on animation primitives that are specific to the operating system of the user endpoint device 108. In one embodiment, the GUI 200 cannot interact with the user until the GUI 200 is fully launched.

In one embodiment, the GUI 200 is closed in a manner that is the reverse of the launching sequence described above and illustrated in FIGS. 5A-5C. In particular, the last petal $202_4$ "detaches" from the first petal $202_1$ and rotates around the central point 204 in a counter-clockwise manner such that it closes "underneath" the second to last petal $202_3$. In one embodiment, the last petal $202_4$ shrinks in size as it closes underneath the second to last petal $202_3$. The remaining petals 202 rotate in the same manner in a counter-clockwise direction, collapsing underneath the next petal 202 until only the first petal $202_1$ is visible (with the remaining petals 202 being stacked underneath the first petal $202_1$). The GUI 200 then vanishes.

The GUI 200 thus presents a menu of options to a user in a manner that is aesthetically pleasing, easy to understand and use, and minimizes interference with currently active applications.

Figure 6:
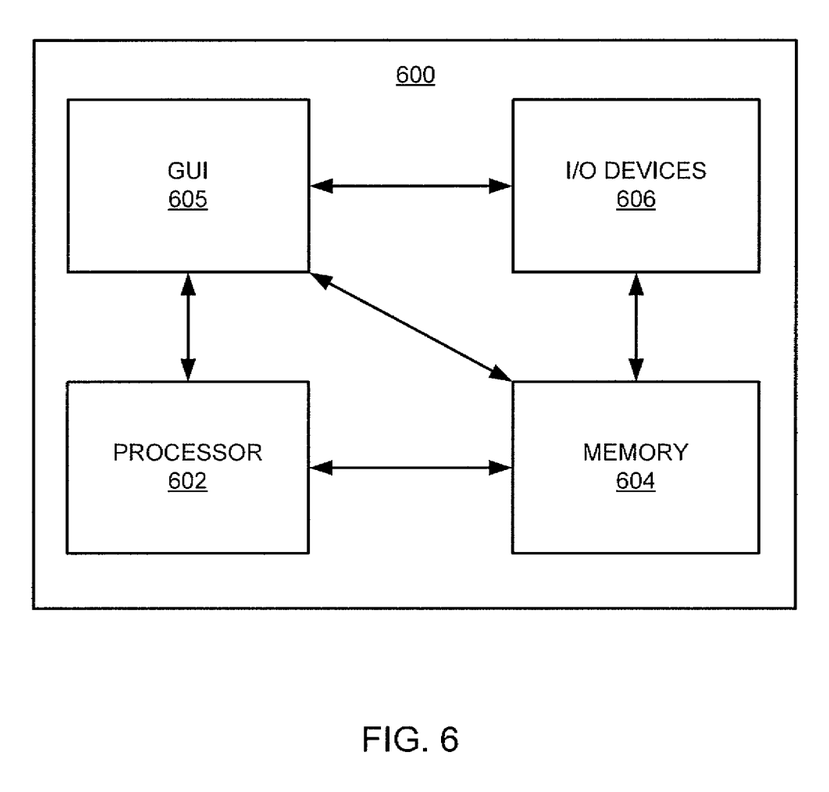
FIG. 6 is a high level block diagram of the present invention implemented using a general purpose computing device.

FIG. 6 is a high level block diagram of the present invention implemented using a general purpose computing device 600. In one embodiment, the general purpose computing device 600 is deployed as a user endpoint device, such as any of the user endpoint devices 108, 110, 112, and 114 illustrated in FIG. 1. It should be understood that embodiments of the invention can be implemented as a physical device or subsystem that is coupled to a processor through a communication channel. Therefore, in one embodiment, a general purpose computing device 600 comprises a processor 602, a memory 604, a GUI module 605, and various input/output (I/O) devices 606 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., GUI module 605) can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the GUI module 605 for presenting a menu of options described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A computing device comprising:
a processor;
a memory; and
a display visibly displaying a graphical user interface (GUI), the graphical user interface comprising:
a menu comprising selectable options, each option corresponding to at least one of a plurality of actions executable by a device displaying the GUI, each option visually depicted as an individual petal, said petals displayed as a stack stemming from a common central pivot point within a display of the GUI, each petal configured to open and close around the common central pivot point by rotating the stack in a clockwise or counter-clockwise direction, each petal continuously maintaining contact with the common central pivot point during said rotation, each petal having a size configured to change as the stack is rotating, the size of a respective petal during rotation is based on a position of the respective petal to other petals in the stack.

2. The computing device of claim 1, wherein each of the plurality of petals comprises a generally tapered shape that tapers outward from the common central pivot point.

3. The computing device of claim 1, wherein each of the plurality of petals displays a graphic associated with one of the plurality of executable actions.

4. The computing device of claim 3, wherein the graphic is at least one of: an alphanumeric character, an icon, or a logo.

5. The computing device of claim 1, wherein the graphical user interface is superimposed over at least a portion of a display of the device operated by the user.

6. The computing device of claim 1, wherein the device operated by the user is a computing device having a touch screen display.

7. The computing device of claim 1, wherein the plurality of executable actions include actions relating to the sharing or saving of data.

8. The computing device of claim 7, wherein the data is a document or a document summary.

9. The computing device of claim 1, wherein the plurality of petals are of equal size.

10. A method comprising:
    displaying, on a display of a device, a graphical user interface (GUI), the GUI comprising a menu comprising selectable options, each option corresponding to at least one of a plurality of actions executable by the device, each option visually depicted as an individual petal, said petals displayed as a stack stemming from a common central pivot point within the GUI;
    receiving, at the device via the GUI, user input associated with at least displayed petal;
    rotating, on the GUI, via the device, said stacked petals based on said user input, said rotation comprising rotating the stack in a clockwise or counter-clockwise direction around the common central pivot point, such that, during rotation, each petal continuously maintaining contact with the common central pivot point, said rotation further comprising changing a size of each petal based on a position of each petal to each other petal's position during said rotation; and
    executing, via the device, for display within said GUI, an executable action associated with the petal associated with the user input based on said rotation.

11. The method of claim 10, wherein the first signal is received via a touch screen display of the device.

12. The method of claim 10, wherein the displaying comprises:
    opening the plurality of petals from the stack until all of the plurality of petals are visible.

13. The method of claim 12, wherein the stack comprises:
    a first petal of the plurality of petals, the first petal being visible on a top of the stack, wherein the first petal is a first petal encountered in the graphical user interface when moving in a clockwise direction from a top of the graphical user interface; and
    a last petal of the plurality of petals, the last petal being positioned beneath the first petal, wherein the last petal is a last petal encountered in the graphical user interface when moving in the clockwise direction from the top of the graphical user interface.

14. The method of claim 13, wherein the stack further comprises:
    a remainder of the plurality of petals positioned beneath the first petal in a descending order in which the remainder of the plurality of petals are encountered in the graphical user interface when moving in the clockwise direction from the top of the graphical user interface.

15. The method of claim 13, wherein the opening comprises rotating the plurality of petals in the clock-wise direction, such that when the opening is complete, a corolla is formed in which the last petal is positioned next to the first petal.

16. The method of claim 10, further comprising:
    receiving a second signal from the user indicating that the user wishes to execute one of the plurality of executable actions; and
    executing the one of the plurality of executable actions responsive to the second signal.

17. The method of claim 16, further comprising:
    closing the graphical user interface after receiving the second signal.

18. The method of claim 17, wherein the closing comprises:
    rotating the plurality of petals in the counter-clockwise direction until the plurality of petals forms a stack, wherein only one of the plurality of petals is visible on top of the stack; and
    removing the stack from a display of the device.

19. A non-transitory computer-readable storage medium, tangibly encoded with computer-executable instructions, that when executed by a processor, perform a method comprising:
    displaying, on the display of a device, a graphical user interface (GUI), the GUI comprising a menu comprising selectable options, each option corresponding to at least one of a plurality of actions executable by the device, each option visually depicted as an individual petal, said petals displayed as a stack stemming from a common central pivot point within the GUI;
    receiving, at the device via the GUI, user input associated with at least displayed petal;
    rotating, on the GUI, via the device, said stacked petals based on said user input, said rotation comprising rotating the stack in a clockwise or counter-clockwise direction around the common central pivot point, such that, during rotation, each petal continuously maintaining contact with the common central pivot point, said rotation further comprising changing a size of each petal based on a position of each petal to each other petal's position during said rotation; and
    executing, via the device, for display within said GUI, an executable action associated with the petal associated with the user input based on said rotation.

20. The computing device of claim 7, wherein the data is displayed beneath the plurality of petals and the common central point.

* * * * *